(12) United States Patent
Wong et al.

(10) Patent No.: US 7,594,265 B2
(45) Date of Patent: Sep. 22, 2009

(54) SYSTEM FOR PREVENTING UNAUTHORIZED ACCESS TO SENSITIVE DATA AND A METHOD THEREOF

(75) Inventors: Daniel W. Wong, North York (CA); Kenneth Man, North York (CA)

(73) Assignee: ATI Technologies, Inc., Thornhill, Ontario (CA)

( * ) Notice: Subject to any disclaimer, the term of this patent is extended or adjusted under 35 U.S.C. 154(b) by 1773 days.

(21) Appl. No.: 09/992,823

(22) Filed: Nov. 14, 2001

(65) Prior Publication Data
US 2003/0093683 A1 May 15, 2003

(51) Int. Cl.
*H04L 9/32* (2006.01)
*H04L 9/00* (2006.01)
*G06F 7/04* (2006.01)

(52) U.S. Cl. .................. 726/22; 713/189; 713/190; 713/191; 713/192; 713/193; 380/201

(58) Field of Classification Search .......... 380/200, 380/259, 277, 201; 713/190–194, 189; 726/22
See application file for complete search history.

(56) References Cited

U.S. PATENT DOCUMENTS

| | | | | |
|---|---|---|---|---|
| 4,520,232 | A * | 5/1985 | Wilson | 380/28 |
| 5,495,432 | A * | 2/1996 | Ho | 708/313 |
| 5,675,793 | A * | 10/1997 | Crick et al. | 713/1 |
| 5,930,361 | A * | 7/1999 | Hayashi et al. | 380/210 |
| 6,023,585 | A * | 2/2000 | Perlman et al. | 717/178 |
| 6,236,727 | B1 * | 5/2001 | Ciacelli et al. | 380/212 |
| 6,409,089 | B1 * | 6/2002 | Eskicioglu | 235/492 |
| 6,868,495 | B1 * | 3/2005 | Glover | 713/190 |
| 7,000,106 | B2 * | 2/2006 | Carter | 713/164 |
| 7,298,851 | B1 * | 11/2007 | Hendricks et al. | 380/282 |
| 2002/0129374 | A1 * | 9/2002 | Freeman et al. | 725/91 |
| 2003/0009679 | A1 * | 1/2003 | Smith et al. | 713/189 |
| 2003/0168508 | A1 * | 9/2003 | Daellenbach et al. | 235/379 |

\* cited by examiner

*Primary Examiner*—Longbit Chai (57) ABSTRACT

A method and system for prevention of unauthorized access to multimedia data are disclosed herein. A tamper-resistant system having a software driver, a peripheral device, and a system memory is used to encrypt sensitive routines used by the software driver. The software driver is used to interface between one component of the system, such as a processor, and a peripheral device, such as a graphics chip. The driver incorporates one or more sensitive routines, that if divulged, could possibly allow an unauthorized party access to data processed by the software driver. Accordingly, in one embodiment, the sensitive routines are stored in an encrypted format with the driver. To access a sensitive routine, the driver submits the associated encrypted routine to the peripheral device, as well as a decryption method, if desired, where it is decrypted and stored in a plaintext format in a location, such as system memory, accessible to both the driver and the peripheral device. The driver can then use the plaintext routine to process the data. When finished processing the data, the plaintext routine can be re-encrypted using one or more of a variety of encryption methods and stored with the driver. Any remaining copies of the plaintext routine can be removed from the system. By encrypting the sensitive routines at all times other than when in immediate use, the system can effectively prevent an unauthorized party from accessing data based on knowledge about the sensitive routine. In addition, the use of the hardware of the peripheral device to encrypt/decrypt the sensitive routines provides an additional barrier to an unauthorized party.

22 Claims, 5 Drawing Sheets

SYSTEM FOR PREVENTING UNAUTHORIZED ACCESS TO SENSITIVE DATA AND A METHOD THEREOF

FIELD OF THE DISCLOSURE

The present invention relates generally to securing data and more particularly to the prevention of unauthorized access to confidential data.

BACKGROUND

Protection of confidential or copyrighted data is of vital importance in a number of industries. As a result, a number of ways to prevent unauthorized access to the confidential data have been developed. One common method to prevent access is to encrypt some or all of the confidential data, thereby making it useless to unauthorized parties. For example, video data from a digital versatile disc (DVD) played on a DVD drive in a personal computer is often encrypted or encoded between a graphics chip and its associated software driver. Once received by the graphics chip, the video data is decoded or decrypted and formatted for display. Since the data output from the graphics chip often requires more storage space than the corresponding video data transmitted between the driver and the graphics chip, an unauthorized party generally prefers to gain access to the smaller set of data. However, since some or all of the data between the software driver and the graphics chip is encrypted, it is useless to an unauthorized party in its encrypted form.

Although the confidential data may be encrypted or otherwise encoded to make it indecipherable to unauthorized parties, methods exist to defeat the encryption. One method used to defeat the encryption is for an unauthorized party to gain access to the sensitive data encryption routine used by the software driver to encrypt confidential data. By reverse engineering of the data encryption routine, the unauthorized party can "crack" the encryption, thereby decrypting the confidential data. Accordingly, conventional methods of preventing an unauthorized party from obtaining a sensitive encryption routine of the software driver include encrypting the encryption routine when it is not in use. However, these conventional methods are inefficient, as they generally use a central processing unit or other heavily-used processor to perform the encryption of the encryption routine. This often results in overloading the central processing unit, thereby reducing system performance.

Given this limitation, as discussed, it is apparent that a way to more effectively prevent unauthorized access to confidential data would be beneficial.

BRIEF DESCRIPTION OF THE DRAWINGS

Various objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification.

DETAILED DESCRIPTION OF THE FIGURES

In accordance with at least one embodiment of the present invention, a first encrypted routine of a software driver is sent to a peripheral device, wherein the software driver is to interface with the peripheral device. The first encrypted routine is decrypted at the peripheral device to generate a plaintext routine. The plaintext routine is then provided to the software driver. One advantage of one embodiment of the present invention is that unauthorized access to confidential or copyrighted data can be more effectively prevented. Another advantage is that processing resources may be used more efficiently.

FIGS. 1-5 illustrate a system to prevent unauthorized access of sensitive data utilized by the system, as well as a method for its use. A software driver is used to interface between one component of the system, such as a processor, and a peripheral component, such as a graphics chip. The software driver incorporates sensitive data that, if divulged, could possibly allow an unauthorized party access to data processed by the software driver. For example, the sensitive data could include encryption routines for encrypting data transmitted between the software driver and the peripheral device. Accordingly, in one embodiment, the sensitive data is stored in an encrypted format with the software driver. When the software driver needs to access the sensitive data, the software driver submits an encrypted version of the sensitive data to the peripheral component, where it is decrypted and stored in a plaintext format in a location, such as system memory, accessible to both the software driver and the peripheral component. The software driver can then use the plaintext data as necessary. Alternately, in another embodiment, the plaintext data can be provided to another software driver. When the software driver is finished processing utilizing the plaintext data, the plaintext data can be re-encrypted using one or more of a variety of encryption methods and stored with the software driver. Any remaining copies of the plaintext data can be removed from the system. In one embodiment, the peripheral component utilizes a pre-defined encryption/decryption algorithm for encoding other types of data for decryption of the encrypted routine and/or encryption of the plaintext routine. In another embodiment, the software driver sends the algorithm and/or binary codes used for encryption/decryption by the peripheral component. By encrypting the sensitive data at all times other than when in immediate use, the system and/or method can efficiently protect data from an unauthorized party. In addition, the use of the hardware of the peripheral component to encrypt/decrypt the sensitive data provides a barrier to an unauthorized party. For example, since prior knowledge about the specifications and/or properties of one or more elements of the peripheral component generally would be needed before an attempt to gain access is made.

Figure 1:
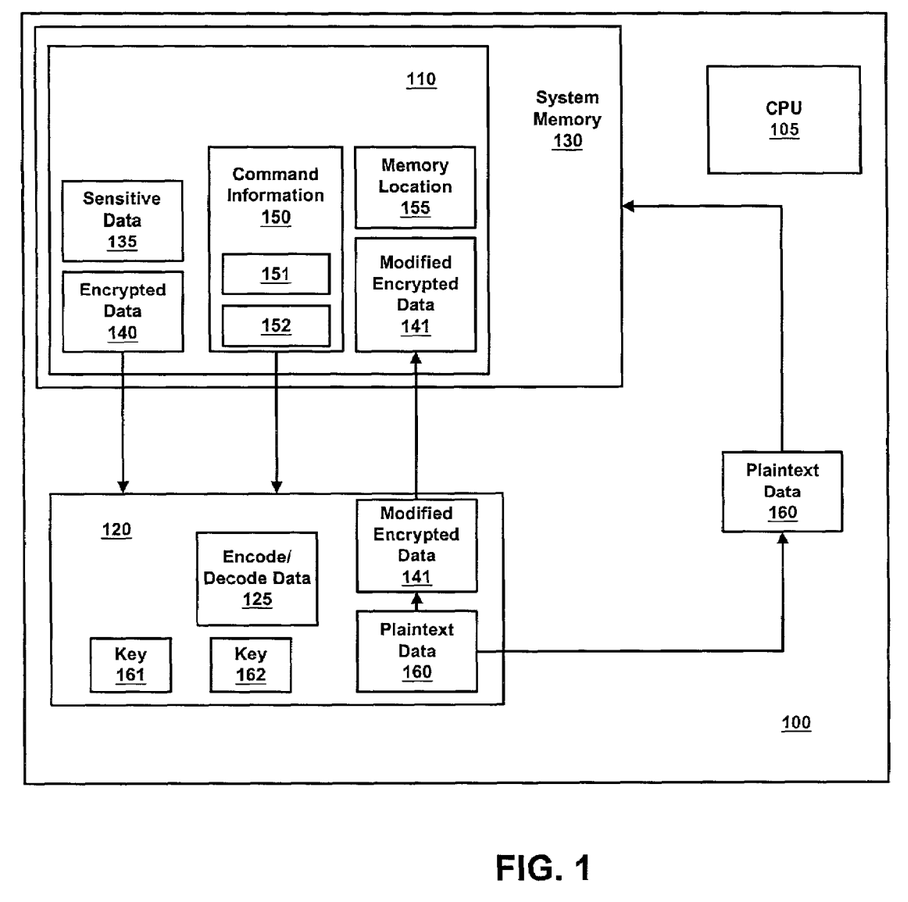
FIG. 1 is a block diagram illustrating a tamper-resistant system according to at least one embodiment of the present invention.
Figure 2:
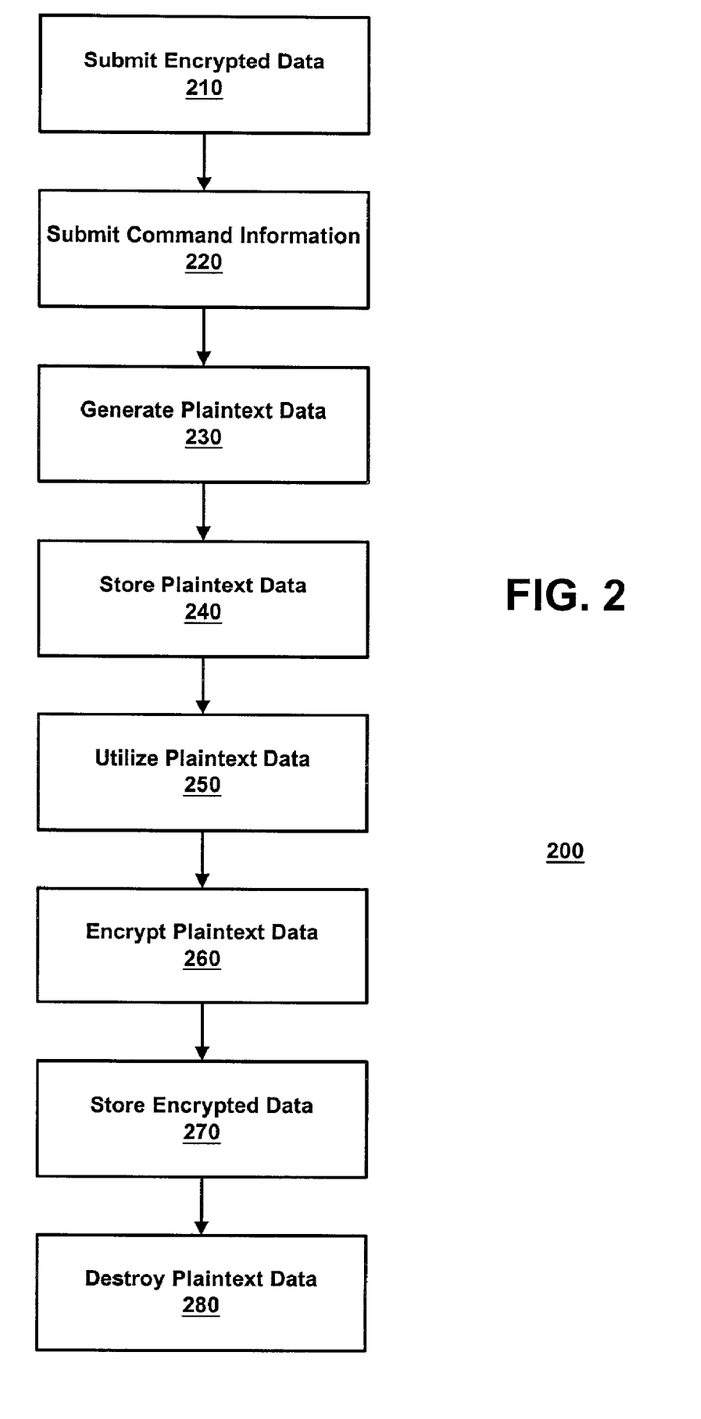
FIG. 2 is a flow diagram illustrating a tamper-resistant method according to at least one embodiment of the present invention.

Referring now to FIGS. 1 and 2, a system and method for preventing access to sensitive data are illustrated according to at least one embodiment of the present invention. Tamper-resistant system 100 includes application 110, peripheral device 120, and system memory 130. Application 110 can include a software or hardware application to interface with a peripheral device (such as peripheral device 120), and can be implemented as a sub-set of instructions of a software application, as a separate software application, as a hardware component such as an application specific integrated circuit, and the like. For example, application 110 could include a software driver, an operating system kernel, a memory controller, and the like. Although application 110 can include a software application, a hardware application, or a combination thereof, embodiments wherein application 110 includes a software application are discussed herein for purpose of discussion. In one embodiment, application 110 is stored as a set of executable instructions in system memory 130 and made available for processing by central processing unit 105.

Peripheral device 120 can include any device or system accessible and/or utilized by application 110. For example, application 110 could include a software driver to control peripheral device 120 and peripheral device 120 could include a graphics chip, graphics accelerator card, or sound card of a personal computer, a network chip, a modem card, and the like. System memory 130, in one embodiment, is accessible to both application 110 and peripheral device 120. For example, peripheral device 120, and system memory 130 (where application 110 can be stored) could reside together on the motherboard of a computer. System memory 130 can include random access memory (RAM), flash memory, a frame buffer, a storage device, such as a hard drive, and the like. Note that the terms "encryption" and "encoding" are similar in nature, and therefore may be used interchangeably unless otherwise noted, as may the terms "decryption" and "decoding".

Application 110, in one embodiment, includes one or more sensitive data 135 utilized by application 110. For example, sensitive data 135 could include a device identification (ID), a chip ID, authentication data such as a private encryption key, and the like. Additionally, in at least one embodiment, includes sensitive data 135 includes a routine or method implemented as software or executable code. For example, in this embodiment, sensitive data 135 can include one or more sensitive subroutines, function calls, Java Applets, hypertext markup language (HTML) tags, script routines, functions, and the like. Sensitive data 135 (as a software routine or method) can be implemented as a high-level computer language, machine level code, etc. Embodiments wherein sensitive data 135 includes routines or methods are discussed in greater detail with reference to FIG. 3.

Sensitive data 135 is generally deemed sensitive when, if divulged to an unauthorized party such as a hacker, the unauthorized party could gain access to confidential data or information using the divulged sensitive data 135. For example, if sensitive data 135 includes a private encryption/decryption key, and a hacker was to obtain the private encryption/decryption key, the hacker could decrypt sensitive information encrypted using the private encryption/decryption key using reverse engineering or other methods. Note that, in at least one embodiment, sensitive data 135 is not stored in plaintext form, since this would allow an unauthorized party to use it. Instead, in one embodiment, an encrypted version (encrypted data 140) of sensitive data 135 is stored in a location accessible by application 110, such as in system memory 130, as discussed in greater detail subsequently. In at least one embodiment wherein sensitive data 135 includes a sensitive routine, a plurality of the sensitive routines, each being functionally equivalent but having different formats or coding styles, is used by application 110. In this case, one or more encrypted versions of the subroutines (encrypted data 140) may be stored with application 110 in place of each of the plurality of sensitive routines.

In at least one embodiment, application 110 further includes one or more decryption codes 151 and/or encryption codes 152. Decryption code 151 and/or encryption code 152 can include a variety of implementations of an encryption/decryption algorithm, such as binary code, a script, a JavaScript, or other encryption/decryption methods executable by peripheral component. Decryption code 151 and/or encryption code 152, in one embodiment, are provided by a third-party vendor, such as a manufacturer of peripheral device 120. Decryption code 151 and/or encryption code 152 can be implemented as part of command information 150.

A method for using tamper-resistant system 100 to prevent access to sensitive data 135, herein referred to as tamper-resistant method 200, initiates in step 210, where application 110 submits an encrypted copy (encrypted data 140) of sensitive data 135 to peripheral device 120. Sensitive data 135 can be encrypted to generate encrypted data 140 using a variety of methods. For example, sensitive data 135 could be encrypted at the time of creation of sensitive data 135. Alternately, sensitive data 135 is encrypted to generate encrypted data 140 using one of the embodiments of the present invention as discussed subsequently with reference to plaintext data 160. Recall that a number of different versions of sensitive data 135, such as versions of a sensitive routine that are not functional and act as decoys to unauthorized access, may be stored with application 110. In this case, application 110 also selects and submits an encrypted routine from one or more encrypted routines (encrypted data 140) associated with the desired sensitive routine.

In addition to encrypted data 140, application 110, in one embodiment, submits command and control information (command information 150) to peripheral device 120. Command information 150 can include authentication information, index values used to determine properties of an encryption method, one or more memory address references (memory location 155), a value referencing a decryption method to use, key 161 and/or key 162, etc. Command information 150, in one embodiment, also includes one or more decryption codes 151 and/or encryption codes 152, such as an encryption method in binary code form. Peripheral device 120, in one embodiment, uses a decryption method or algorithm (such as decryption code 151 provided with command information 150) to decrypt encrypted data 140 to generate a plaintext version (plaintext data 160) of sensitive data 135 in step 230. Although the decryption routine used by peripheral device 120, in one embodiment, is provided by application 110, in other embodiments, peripheral device 120 utilizes a decryption method provided otherwise, such as a decryption method hard-coded into the circuitry of a component of peripheral device 120. For example, in one embodiment, peripheral device 120 uses a pre-defined encode/decode method (encoding/decoding method 125), such as DCT/IDCT or MPEG encoding/decoding, normally used to encode and decode data sent between application 110 and peripheral device 120 to decrypt (or decode) encrypted data 140. A native command set associated with peripheral device 120 may be used for encoding and decoding. Encryption/decryption algorithms (decryption code 151 and/or encryption code 152) used by peripheral device 120 can include, but are not limited to, pretty good privacy (PGP), data encryption standard (DES), Rivest-Shamir-Adleman (RSA), elliptic curve encryption, etc. In at least one embodiment, the encryption and/or decryption routine includes an encryption algorithm based on an encryption/decryption key (keys 161, 162), herein referred to as a "key".

Plaintext data 160, in at least one embodiment, is a copy or version of sensitive data 135. For example, plaintext data 160 could be an exact replica of sensitive data 135, or plaintext data 160 could be a modified version in cases where one or more data structures associated with plaintext data 160 are modified. The term "plaintext", as used herein, refers to the decrypted, or unencrypted, copy of an encrypted object. For example, if an original message was to be encrypted to generate an encrypted message which can be decrypted to generate a plaintext message, where the plaintext message, in general, is an exact replica or duplicate of the original image. Accordingly, unless otherwise noted, reference to plaintext data 160 also applies to sensitive data 135 and vice versa.

In step 240, peripheral device 120, in one embodiment, stores plaintext data 160 in system memory 130 in a location known to application 110. It will be appreciated that since a version of sensitive data 135 is stored as plaintext (plaintext data 160) in system memory 130, it is generally desirable to prevent an unauthorized party from obtaining plaintext data 160 by obscuring its location in system memory 130. Accordingly, the location in system memory 130 can be indicated by memory location 155 (transmitted from application 110 as part of command information 150) or predetermined using an algorithm known to application 110 and peripheral device 120, such as a seeded psuedo-random number generator, and the like.

In step 250, application 110 utilizes plaintext data 160 stored in system memory 130. For example, plaintext data 160 could include an encryption routine used to encrypt audio signals going from application 110 to a sound card (peripheral device 120) in order to prevent a hacker from obtaining the audio signal data between application 110 and peripheral device 120. Likewise, in another example, sensitive data 135 could include a device ID used for authentication purposes. In this example, the device ID of peripheral device 120 could be stored in system memory 130 in an encrypted form (encrypted data 140) and retrieved by application 110. Application 110 could submit the encrypted device ID to peripheral device 120 for decryption, as discussed previously in steps 210-240. The plaintext version of the device ID (plaintext data 160) could then be used by application 110 to authenticate peripheral device 120.

Alternately, in another embodiment, plaintext data 160 can be provided to another application (not shown) for its use. For example, plaintext data 160 could include a private encryption/decryption key for use by another encryption/decryption program that is better protected from unauthorized access than the application 110. In this case, sensitive data 135 could be stored with application 110 (in encrypted form as encrypted data 140). When needed by the other application, the other application could contact application 110 and request sensitive data 135. Upon receiving the request, application 110 can submit encrypted data 140 to peripheral device 120 for decryption. After decrypting encrypted data 140 to generate plaintext data 160, peripheral device 120 or application 110 could provide plaintext data 160 to the other application for its use.

Plaintext data 160, in one embodiment, includes a data structure associated with it that would be necessary the next time plaintext data 160 is utilized by application 110. For example, plaintext data 160 could include a variable used to count the total number of bytes transmitted by peripheral device 120 to another device or system. In this case, the sum of the bytes should be retained for the next time plaintext data 160 is called. Accordingly, in at least one embodiment, plaintext data 160 is re-encrypted to generate modified encrypted data 141 in step 260, where modified encrypted data 141 is a similar, but not exact, version of encrypted data 140 as a result of the modified data structure associated with plaintext data 160. In one embodiment, plaintext data 160 is encrypted by peripheral device 120 using encryption code 152 provided by application 110. In another embodiment, peripheral device 120 encrypts (or encodes) plaintext data 160 by using a predetermined encoding/encryption algorithm (encode/decode routine 125) normally used to encode other types of data, such as a DCT transform or MPEG encoding. In at least one embodiment, more than one encryption iteration is performed on plaintext data 160. In this case, plaintext data 160 could be encrypted by one element of peripheral device 120, then the encrypted output of the one element could then be encrypted by another element of peripheral device 120. Note that in embodiments where plaintext data 160 is not altered or where no information associated with plaintext data 160 needs to be retained, step 260 may be omitted.

In step 270, modified encrypted data 141, in one embodiment, is stored with in system memory 130 for access by application 110. Modified encrypted data 141, in one embodiment, is transmitted directly from peripheral device 120 to the memory location of application 110. In another embodiment, modified encrypted data 141 is stored separately in system memory 130. In this case, modified encrypted data 141 should be stored in a location known to application 110 so that application 110 can access modified encrypted data 141 for subsequent use. Plaintext data 160, in one embodiment, is removed from system memory 130 and/or peripheral device 120 in step 280 to prevent unauthorized access. Plaintext data 160 may be removed by overwriting plaintext data 160 in memory (system memory 130) with other data, removing reference to plaintext data 160 from a memory manager associated with system memory 130, and the like.

Note that, in at least one embodiment, sensitive data 135, encrypted data 140, modified encrypted data 141, and plaintext data 160 are all versions of a same routine. For example, encrypted data 140 could include an encrypted version of an encryption routine, where the encryption routine is represented by sensitive data 135. As a result of decrypting encrypted data 140, plaintext data 160 may be generated, where plaintext data 160 is a similar or exact duplicate of sensitive data 135. In the event that plaintext data 160 is modified, such as by modifying a data structure associated with plaintext data 160, plaintext data 160 can be encrypted, thereby generating modified encrypted data 141. In this case, modified encrypted data 141 and encrypted data 140 are encrypted versions of two sets of data that are essentially similar, but where the property of one of the sets of data (plaintext data 160) has been modified before being encrypted.

Multimedia systems, such as video display systems, are especially prone to unauthorized attempts at access of data and information processed by the systems. For example, hackers often attempt to produce unauthorized copies of a digital versatile disc (DVD) by using doctored or modified DVD players to capture data from the DVD in an encoded form. Accordingly, a specific implementation of tamper-resistant system 100 wherein sensitive data to be protected includes one or more sensitive routines is illustrated according to at least one embodiment of the present invention with reference to FIGS. 3 and 4.

Figure 3:
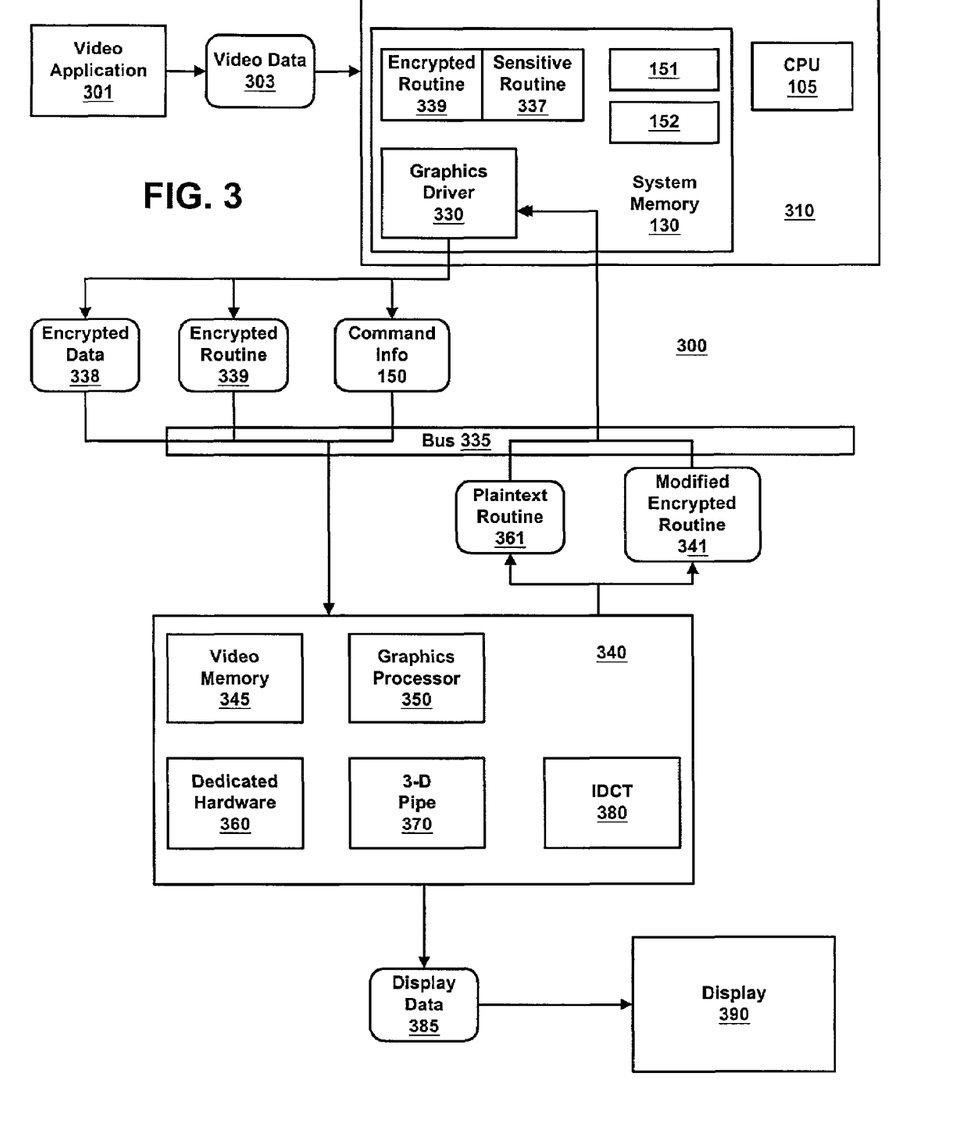
FIG. 3 is a block diagram illustrating a tamper-resistant video display system according to at least one embodiment of the present invention.

Video display system 300 (one embodiment of tamper-resistant system 100, FIG. 1) includes video application 301, video processing system 310, bus 335, graphics chip 340, and display 390. Video application 301 can include video applications such as DVD player software, a digital television tuner, an application programming interface (API), video decoding software or hardware, and the like. Video processing system 310 (a particular implementation of system memory 130 and central processing unit 105 referenced in FIG. 1) includes graphics driver 330 (one embodiment of application 110), central processing unit 105, and system memory 315. Graphics driver 330, in one embodiment, includes a set of instructions or software stored in system memory 130 and executed on central processing unit (CPU) 105. Video processing system 310 can include various processing systems, such as a desktop computer, a DVD player, etc. Video processing system 310, in one embodiment, is connected to graphics chip 340 via bus 335. Bus 335 can include a bus, such as a peripheral component interconnect (PCI) bus or accelerated graphics port (AGP). Bus 335 can also include a serial connection, a parallel connection, a network, a universal serial bus (USB), FireWire, and the like.

Figure 4:
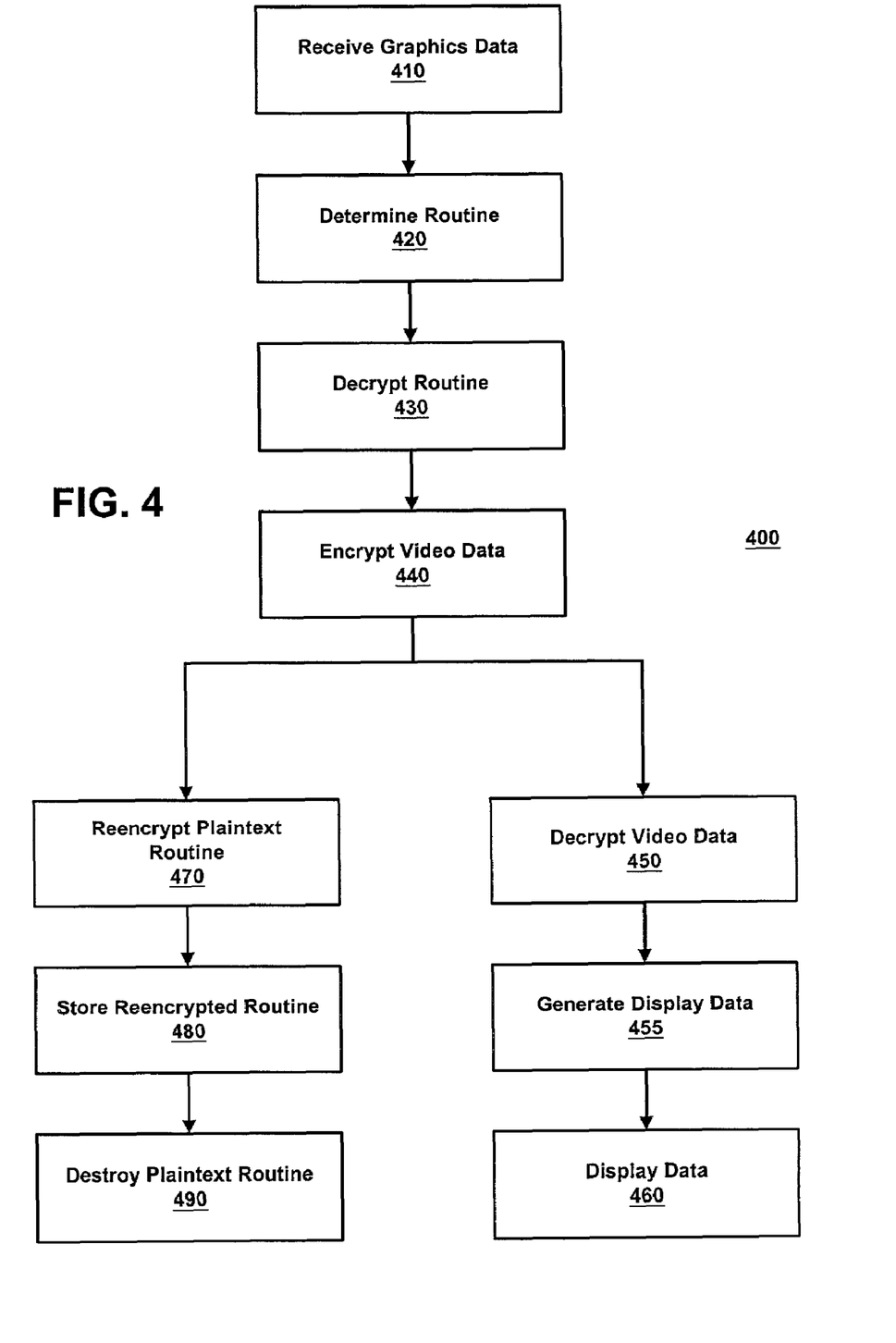
FIG. 4 is a flow diagram illustrating a tamper-resistant video display method according to at least one embodiment of the present invention.

Graphics chip 340 (a particular implementation of peripheral device 120 referenced in FIG. 1) can include various graphics processing systems, such as a graphics chip, a graphics accelerator card, a video card, and the like. Graphics chip 340 includes video memory 345, graphics processor 350, dedicated hardware 360, three-dimensional (3-D) pipe 370, and/or inverse discrete cosine transform (IDCT) module 380. The functions of elements of graphics chip 340 are discussed in greater detail with reference to video display method 400 (FIG. 4). Display 390 can include a variety of display devices, such as a television, liquid crystal display (LCD), a computer monitor, and the like.

Video display system 300, in one embodiment, processes video content (video data 303) from video application 301 using video processing system 310 and/or graphics chip 340 to generate display data 385 for display on display 390. In one embodiment, some or all of data sent between graphics driver 330 and graphics chip 340 is encrypted/encoded to protect the video content represented. Accordingly, graphics chip 340 should decrypt the encrypted content before it is processed by respective components. Since the encryption and decryption routines used by graphics driver 330 and/or graphics chip 340 to encrypt and decrypt the video content (video data 303) could be used by an unauthorized party to gain access to the video content of the encrypted data sent between graphics driver 330 and graphics chip 340, in at least one embodiment, video tamper-resistant method 400 is utilized to protect the data.

Video tamper-resistant method 400 initiates in step 410, wherein video data 303 is transmitted from video application 301 to video processing system 310. In one embodiment, video application 301 can include an application programming interface (API) or a device driver interface (DDI), such as a DirectX Video Acceleration API/DDI. In this case, video application 301 could transmit data from a software application (not shown) that interfaces with video application 301. For example, a software application that processes Motion Picture Experts Group (MPEG) files could interface with an API (video application 310) to transmit video data 303 to video processing system 310. Video data 303 can include video content data in a "raw" format, such as bit-map frame data, or in an encoded or processed form. For example, video data 303 can include transform coefficients generated by a forward discrete cosine transform (FDCT) and motion compensation vector information derived from captured video frame information.

In step 420, graphics driver 330 determines a sensitive routine 337 (one embodiment of sensitive data 135, FIG. 1), wherein sensitive routine 337 includes a sensitive encryption routine to be used to encrypt video data 303. A variety of different encryption methods or algorithms can be used to encrypt video data 303, such as PGP or DES. As discussed previously, a number of different, but functionally equivalent, sensitive routines 135 may be used by or available to application 110. In this case, application 110 could select in step 420 the encryption routine (sensitive routine 337) appropriate to the type of encryption desired, the size of the data to be encrypted, the capabilities of graphics chip 340, etc.

As discussed previously, in at least one embodiment, an encrypted version (encrypted routine 339) of the encryption routine (sensitive routine 337) is implemented by graphics driver 330 to protect against unauthorized access. In this case, encrypted routine 339 (one embodiment of encrypted data 140, FIG. 1) can be decrypted in step 430 by graphics chip 340 to generate plaintext routine 361 (one embodiment of plaintext data, FIG. 1) for use by graphics driver 330. Command information 150, as discussed previously, can be used in the decryption of encrypted routine 339. For example, command information 150 could include a memory address (memory location 155, FIG. 1), an index value used to select an encryption method or key, and the like. As discussed previously, command information 150 can also include one or more decryption codes 151 and/or encryption codes 152, where codes 151, 152 are implementations of one or more encryption/decryption methods executable by graphics chip 340, such as a DES algorithm implemented as binary code. In this case, graphics chip 340 could use decryption code 151 to decrypt encrypted routine 339 to generate plaintext routine 361. Recall that plaintext routine 361, in one embodiment, is stored in system memory 130 in a location known to graphics driver 330. Alternately, plaintext routine 361 can be stored in video memory 345, which can include RAM, flash memory, a frame buffer, a storage device, and the like.

The decryption of encrypted routine 339 to generate plaintext routine 361 in step 430 can be performed by a number of elements of graphics chip 340. In one embodiment, 3D pipe 370, conventionally used by graphics chip 340 to process 3D commands from graphics driver 330, also is used to decrypt encrypted routine 339. 3D pipe 370 often is capable of complex calculations, and therefore could perform complex encryption/decryption routines. As discussed further with reference to FIG. 5, a map, such as a texture map, could be used for the generation of keys used in the encryption/decryption routines. Similarly, in another embodiment, graphics processor 350 is used to decrypt encrypted routine 339. Graphics processor 350 is used by graphics chip 340 to render some or all of the data to be displayed on display 390. Accordingly, like 3D pipe 370, graphics processor 350 is often capable of complex calculations, allowing for complex encryption/decryption methods.

IDCT component 380, in one embodiment, is used to decrypt encrypted routine 339. IDCT component 380 can be used to perform an inverse discrete cosine transform on data that has previously undergone a discrete cosine transform (DCT). In this case, encrypted routine 339 could have been previously encrypted using a DCT, and subsequently decrypted by passing encrypted routine 339 through IDCT component 380. However, in some implementations, additional processing effort and storage may be needed to decrypt encrypted routine than with other methods. For example, a DCT component (not shown) may only accept 9-bit values and output 12-bit values, whereas IDCT component 380 may accept 12-bit values and output 9-bit values. In this case, the byte values of sensitive routine 337 submitted to the DCT component should be shifted to ensure that the least significant bit is not used. As a result, the output (encrypted routine 339) could require more storage space, because each byte then would have 12 bits, rather than 8. To decrypt encrypted routine 339, IDCT component 380 would need to shift back the results to generate plaintext routine 361. However, there may be no guarantee that the least significant bits are accurately recovered, thereby possibly affecting the subsequent execution of plaintext routine 361.

As discussed previously, in at least one embodiment, a pre-defined decoding algorithm, such as a native command set, normally used by a component of graphics chip 340 to encode other types of data may be used to decode/decrypt encrypted routine 339 to generate plaintext routine 361. For example, 3-D pipe 370 could implement an encoding/decoding algorithm (encode/decode routine 125, FIG. 1), such as MPEG, to decode encoded data received from graphics driver 330. In this case, 3-D pipe 370 could use this encoding/decoding algorithm to decode encrypted routine 339, as well as encode plaintext routine 361 to generate modified encrypted routine 341.

Instead of using a component of graphics chip 340 that is also used for actual graphics processing, in one embodiment, dedicated hardware 360 is used for encryption and/or decryption. Dedicated hardware 360 can include hardware dedicated to encryption/decryption processes, such as a programmable logic array chip, combinational logic, embedded circuitry, a state machine, and the like. It will be appreciated that by using dedicated hardware 360, it should make it more difficult for an unauthorized party to reverse engineer the encryption and/or decryption routines since the exact functioning of dedicated hardware 360 may not be known to the unauthorized party, unlike the functioning of other standard elements of graphics chip 340. In one embodiment, combinations of components 350-380, in series, are used for sequentially decoding encrypted routine 339. For example, encrypted routine 339 may be sent to IDCT component 380 to be decoded into a second encrypted routine. The second encrypted routine is in turn decoded by 3D-pipe 370 into plaintext routine 361.

In step 440, plaintext routine 361 is used to encrypt video data 303, generating encrypted data 338. Encrypted data 338 is then transmitted via bus 335 to graphic chip 340. Since encrypted data 338 has been transmitted using plaintext routine 361, unauthorized parties should find it difficult, or impossible, to decrypt encrypted data 338 to obtain the video content (video data 303) without knowing the encryption method and/or key (key 161, FIG. 1) used. Recall that, in one embodiment, plaintext routine 361 can be provided to another software driver for its use, such as encrypting video data. In step 450, graphics chip 340 decrypts encrypted data 338. In at least one embodiment, a decryption method or routine compatible with the encryption routine used in step 430 is used to decrypt encrypted data 338. In step 455, the results of the decryption of encrypted data 338 are processed further by graphics chip 340 to generate display data 385. For example, display 390 could include a video graphics array (VGA) monitor. In this case, graphics chip 340 could render the results of the decryption of decrypted data 338 and convert the rendered data from a digital format to an analog format compatible with display 390 to generate display data 385. In step 460, display data 385 is displayed on display 390.

Previous, during, or subsequent to steps 450-460, the security risk posed by having an unencrypted version of sensitive routine 337 should be minimized or eliminated. Accordingly, in step 470, plaintext routine 361, in one embodiment, is encrypted (or re-encrypted) by graphics chip 340 to generate modified encrypted routine 341 (one embodiment of modified encrypted data 141, FIG. 1). Plaintext routine 361 can be encrypted using the same component of graphics chip 340 that decrypted encrypted routine 339 in step 430. For example, if dedicated hardware 360 decrypted encrypted routine 339 to generate plaintext routine 361 in step 430, dedicated hardware 360 can re-encrypt plaintext routine 361 in step 470.

Note that, in one embodiment, decryption code 151 (provided as part of command information 150) is used by graphics chip 340 to decrypt encrypted routine 339, regardless of the actual component (such as 3D pipe 370) used for decryption. Similarly, plaintext routine 361 can be encrypted by graphics chip 340 using encryption code 152, regardless of the actual component used for encryption. Note that encryption and decryption can be implemented using different components of graphics chip 340. In addition, different encryption methods can be used to encrypt plaintext routine 361 than the encryption method used to encrypt encrypted routine 339. Recall that one or more data structures associated with plaintext routine 361 can be encrypted with plaintext routine 361 in step 470 should the data structures be needed during subsequent uses of plaintext routine 361 (as a version of sensitive routine 337). Note that a different encryption method may be used to encrypt plaintext routine 361 in step 470 than the decryption method used in step 430. In at least one embodiment, a plurality of components of graphics chip 340 is used to sequentially encrypt plaintext routine 361. For example, plaintext routine 361 could be encrypted by 3D pipe 370 using a first encryption algorithm to produce a first encrypted version of plaintext routine 361. The first encrypted version of plaintext routine 361 could then be encrypted again by graphics processor 350 to generate modified encrypted routine 341. Encryption methods are discussed in greater detail with reference to FIG. 5.

In step 480, modified encrypted routine 341 is stored for later access by graphics driver 330. Modified encrypted routine 341, in one embodiment, is transmitted by graphics chip 340 to video processing system 310 via bus 355 and stored in system memory 130. Modified encrypted routine 341 can be stored together, or as part of, graphics driver 330, as a separate set of instructions, and the like. In step 490, plaintext routine 361 is removed from video display system 300. Plaintext routine 361 may be removed by overwriting the data in system memory 130 representative of plaintext routine 361, by destroying the file structure of plaintext routine 361 in system memory 130, etc. As a result of steps 470-490, the plaintext version (plaintext routine 361) of the encryption routine (sensitive routine 337) used temporarily in step 440 to encrypt video data is re-encrypted and removed from video display system 300, thereby preventing unauthorized parties from obtaining a version of the encryption routine and using it to obtain video data 303 and/or a decrypted version of encrypted data 338.

Although one embodiment of method 400 wherein a sensitive routine 337 is decrypted an used by video display system 300 has been discussed herein, in at least one embodiment, method 400 is applied to other types of sensitive data. For example, in one embodiment, sensitive data 135 (FIG. 1) could include an authentication value, such as a chip ID, or an encryption/decryption key. In this case, an encrypted version of sensitive data 135 could be submitted to graphics chip 340 for decryption. The decrypted version of sensitive data 135 could then be used to authenticate driver 310 to graphics chip 340, or vice versa.

Figure 5:
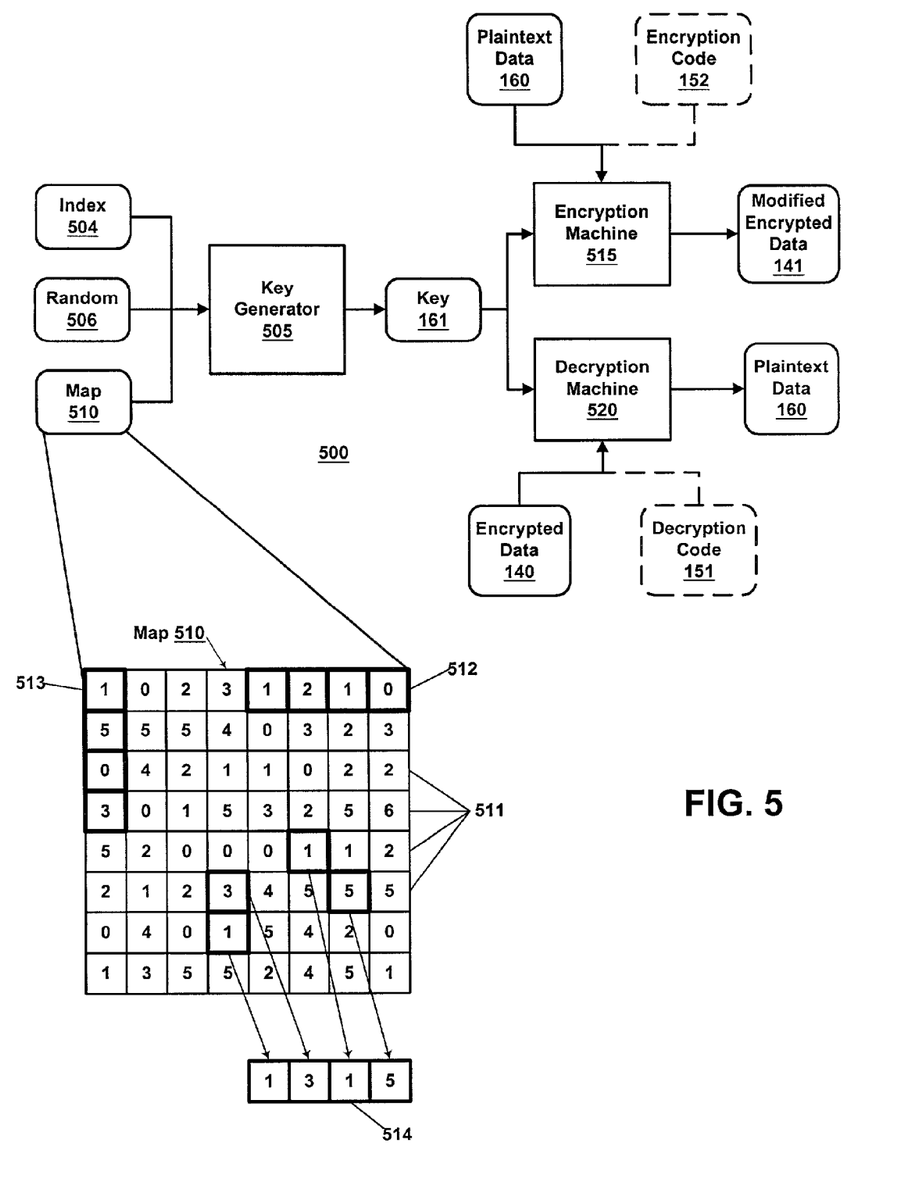
FIG. 5 is a block diagram illustrating an encryption/decryption system according to at least one embodiment of the present invention.

Referring now to FIG. 5, encryption/decryption system 500 to encrypt data and/or sensitive data is illustrated according to at least one embodiment of the present invention. As discussed previously, any appropriate encryption method may be used to encrypt/decrypt sensitive data 135, encrypted data 140, and/or plaintext data 160 (FIG. 1). Many of these encryption/decryption methods use encryption/decryption keys (key 161) in the process of encryption and/or decryption. Accordingly, in at least one embodiment, key generator 505 is used by one or more components of graphics chip 340 (FIG. 3) or peripheral device 120 (FIG. 1) to generate key 161. Key generator 505 can be implemented as a set of executable instructions, combinational logic, a state machine, embedded circuitry, and the like.

In one embodiment, index 504 is supplied to key generator 505 to generate key 161. Index 504 can originate from video processing system 310 (FIG. 3) as part of graphics commands 336 (FIG. 3) or otherwise, or from a component of graphics chip 340, such as 3D pipe 370 (FIG. 3). Index 504 can be used as an index for a lookup table, where the value referenced in the lookup table is output by key generator 505 as key 161. Alternately, index 504 could be modified, such as by adding values, shifting values left or right, applying a logical operator, etc. Index 504 could also be output without modification by key generator 505.

In another embodiment, random value 506 is supplied to key generator 505 to generate key 161. Random value 506 can be generated using a random-number (or psuedo-random number) generator located on either video processing system 310 or graphics chip 340 (FIG. 3). Random value 506 can be used by key generator 505 as an index for a lookup table, modified by key generator 505, output by key generator 505 without modification, and the like.

It will be appreciated that, in general, the more complex (i.e. random and/or long) key 161 used in an encryption method is, the more difficult it is for an unauthorized party to break the encryption method. For example, a 128-bit encryption methods are often much more difficult than 56-bit encryption methods to crack using brute-force methods. Accordingly, in one embodiment, map 510 is submitted to key generator 505 to generate key 161. Map 510 can include a matrix of values having multiple dimensions. In one embodiment, map 510 could include a two-dimensional texture map, as illustrated. Key generator 505 could use the entire texture map (map 510) to generate key 161. Alternately, key generator 505 could select one or more portions of map 510 to generate key 161. For example, key generator 505 could randomly select one or more matrix elements 511 and use their associated values as part of key 161, as illustrated by key primitive 514. Alternately, key generator 505 could used a predefined sequence, defined either by graphics driver 330 or an element of graphics chip 340 (FIG. 3), to select matrix elements 511 for use in generation of key 161, such as key primitives 512, 513.

Key generator 505 may use one or more of key primitives 512-514 to generate key 161 by using the key primitive as an index value for a lookup table, by applying a modification method, or by outputting the one or more key primitives unmodified as key 161. Since map 510 could include a relatively large number of matrix elements 511 and since the method used to select a portion or all of map 510 can be chosen to generate key 161 can be obscured, it should prove difficult, if not impossible, for an unauthorized party to determine the key (key 161) used by encryption/decryption method 500. Note that in at least one embodiment, multiple instances of map are stored and/or used by key generator 505 to further increase the robustness of key generation.

After key generator 505 generates key 161, key 161 is submitted to either encryption machine 515 or decryption machine 520 depending on whether key 161 is to be used for encryption or decryption. Encryption machine 515 and/or decryption machine 520, in one embodiment, are implemented in the hardware of one or more elements of graphics chip 340, such as 3D pipe 370, as discussed previously with reference to FIG. 3. If a plaintext data 160 is to be encrypted (as discussed with reference to step 260 of FIG. 1 or step 470 of FIG. 4), plaintext data 160 and key 161 are submitted to encryption machine 515. Using key 161, encryption machine 515 applies one or more encryption methods, such as RSA or DES, to plaintext data 160 to generate modified encrypted data 141. If encryption code 152 is to be used, encryption code 152 is also submitted to encryption machine 515 for use in encrypting plaintext data 160.

Alternately, if encrypted data 140 is to be decrypted (as discussed with reference to step 230 of FIG. 2 or step 430 of FIG. 4), encrypted data 140 and key 161 are submitted to decryption machine 520. Additionally, decryption code 151, if used, can be submitted to decryption machine 520. Decryption machine 520 can use key 161 to decrypt encrypted data 140 (using decryption code 151, for example) to generate plaintext data 160. In at least one embodiment, different encryption methods may be used for different instances of encryption or decryption of plaintext data 160 and/or encrypted data 140. Note, however, that for many encryption/decryption methods, the decryption method and/or key (key 161) are based on the key (key 161) and/or method used to encrypt. Note that in other embodiments, encryption methods that do not implement encryption/decryption keys are used to encrypt plaintext data 160 and/or decrypt encrypted data 140 as appropriate. Recall that, in at least one embodiment, the encryption routine used by encryption machine 515 includes a predefined encoding method normally utilized by a component of graphics chip 340 (FIG. 3) (or peripheral device 120, FIG. 1) to encode other types of data, such as video data. Likewise, the decryption routine used by decryption machine 520 includes a pre-defined decoding method normally used to decode other types of data. Also recall that, in at least one embodiment, a number of encryption/decryption iterations can be performed by different components (or the same component using different encryption/decryption routines) on data to be encrypted or decrypted.

The various functions and components in the present application may be implemented using an information handling machine such as a data processor, or a plurality of processing devices. Such a data processor may be a microprocessor, microcontroller, microcomputer, digital signal processor, state machine, logic circuitry, and/or any device that manipulates digital information based on operational instruction, or in a predefined manner. Generally, the various functions, and systems represented by block diagrams are readily implemented by one of ordinary skill in the art using one or more of the implementation techniques listed herein. When a data processor for issuing instructions is used, the instruction may be stored in memory. Such a memory may be a single memory device or a plurality of memory devices. Such a memory device may be read-only memory device, random access memory device, magnetic tape memory, floppy disk memory, hard drive memory, external tape, and/or any device that stores digital information. Note that when the data processor implements one or more of its functions via a state machine or logic circuitry, the memory storing the corresponding instructions may be embedded within the circuitry that includes a state machine and/or logic circuitry, or it may be unnecessary because the function is performed using combinational logic. Such an information handling machine may be a system, or part of a system, such as a computer, a personal digital assistant (PDA), a hand held computing device, a cable set-top box, a game console, an Internet capable device, such as a cellular phone, and the like.

One of the implementations of the invention is as sets of computer readable instructions resident in the random access memory of one or more processing systems configured generally as described in FIGS. 1-5. Until required by the processing system, the set of instructions may be stored in another computer readable memory, for example, in a hard disk drive or in a removable memory such as an optical disc for eventual use in a CD drive or DVD drive or a floppy disk for eventual use in a floppy disk drive. Further, the set of instructions can be stored in the memory of another image processing system and transmitted over a local area network or a wide area network, such as the Internet, where the transmitted signal could be a signal propagated through a medium such as an ISDN line, or the signal may be propagated through an air medium and received by a local satellite to be transferred to the processing system. Such a signal may be a composite signal comprising a carrier signal, and contained within the carrier signal is the desired information containing at least one computer program instruction implementing the invention, and may be downloaded as such when desired by the user. One skilled in the art would appreciate that the physical storage and/or transfer of the sets of instructions physically changes the medium upon which it is stored electrically, magnetically, or chemically so that the medium carries computer readable information. The preceding detailed description is, therefore, not to be taken in a limiting sense, and the scope of the present invention is defined only by the appended claims.

In the preceding detailed description of the figures, reference has been made to the accompanying drawings which form a part thereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A method comprising:
   sending a first encrypted routine of a software driver from a processor to a graphics chip, wherein the software driver is to interface with the graphics chip, and where the first encrypted routine is an encrypted version of an encryption routine;
   decrypting, at the graphics chip, the first encrypted routine to generate a plaintext routine, wherein the plaintext routine is a version of the encryption routine; and
   storing the plaintext routine in memory in a location known to the software driver.

2. The method of claim 1, further including sending a decryption code to the graphics chip, where the decryption code is to be used by the graphics chip to decrypt the first encrypted routine.

3. The method of claim 1, wherein decrypting is performed by a 3D pipe of the graphics chip.

4. The method of claim 1, wherein decrypting is performed by a IDCT component of the graphics chip.

5. The method of claim 1, wherein decrypting is performed by dedicated encryption hardware of the graphics chip.

6. The method as in claim 1, wherein decrypting is performed through a series of components coupled within the graphics chip.

7. The method of claim 1, further including removing the plaintext routine.

8. The method of claim 1, further including:
   encrypting, at the graphics chip, the plaintext routine to generate a second encrypted routine; and
   storing the second encrypted routine in memory in a location known to the software driver.

9. The method of claim 8, further including sending an encryption code to the graphics chip, where the encryption code is to be used by the graphics chip to encrypt the plaintext routine.

10. The method of claim 8, wherein the second encrypted routine is a modified version of the first encrypted routine.

11. The method of claim 1, further including selecting the first encrypted routine from a plurality of different encrypted routines, wherein the plurality of different encrypted routines are functionally equivalent.

12. The method of claim 1, wherein decrypting includes using a map as a decryption key.

13. The method of claim 12, wherein the map includes a texture map.

14. The method of claim 1, wherein providing includes storing the plaintext routine in a location in memory accessible by the software driver, and where the location in memory is known to the software driver.

15. A system comprising:
   a processor;
   memory operably coupled to said processor;
   a graphics chip, said graphics chip to decrypt a first encrypted routine, generate a plaintext routine, and store the generated plaintext routine to a memory location of the memory;
   a software driver, wherein said software driver is to interface with said graphics chip, said software driver including a program of instructions capable of being stored in said memory and executed by said processor, and wherein the memory location is known to the software driver, said program of instructions to manipulate said processor to:
      send the first encrypted routine of said software driver to said peripheral device, wherein the first encrypted routine is an encrypted version of an encryption routine; and
      execute the plaintext routine.

16. The system of claim 15, wherein the graphics chip includes a hardware component to encrypt the plaintext routine to generate a second encrypted routine, and where the second encrypted routine is a modified version of the first encrypted routine.

17. The system of claim 15, wherein the graphics chip includes a hardware component to decrypt the first encrypted routine to generate the plaintext routine.

18. The system of claim 17, wherein the hardware component is a 3D pipe.

19. The system of claim 17, wherein the hardware component is a IDCT component.

20. The system of claim 17, wherein the hardware component is a dedicated hardware component.

21. The system of claim 15, wherein said program of instructions further include instructions to manipulate said processor to send a decryption code to said graphics chip, where the decryption code is to be used by said graphics chip to decrypt the first encrypted routine.

22. The system of claim 15, wherein said program of instructions further include instructions to manipulate said processor to send an encryption code to said graphics chip, where the encryption code is to be used by said graphics chip to encrypt the plaintext routine.

* * * * *